United States Patent [19]

Lai

[11] Patent Number: 5,056,424
[45] Date of Patent: Oct. 15, 1991

[54] PICNIC COOKING ASSEMBLY

[76] Inventor: Kou Yen Lai, No. 32, Alley 27, Lane 127, Nan Shan Road, Chung ho city, Taipei Hsien, Taiwan

[21] Appl. No.: 513,218

[22] Filed: Apr. 23, 1990

[51] Int. Cl.$^5$ ............... A47J 33/00; B65D 45/04; B65D 21/02; B65D 25/28
[52] U.S. Cl. ............... 99/339; 99/340; 99/449; 126/373; 206/499; 206/546; 206/547; 206/549; 220/23.86; 220/855 P; 220/94 R; 220/212; 220/322; 220/379; 220/912
[58] Field of Search ............... 99/403, 417, 426, 499, 99/340, 339; 126/373, 378, 390; 220/23.83, 23.86, 94 R, 95, 420-422, 425-427, 431, 669, 912, 212, 379, 322, 4.01, 4.02; D 7/327, 354, 356, 361, 540; 206/499, 518, 546, 541, 515, 514, 549, 547

[56] References Cited

U.S. PATENT DOCUMENTS

| | | | |
|---|---|---|---|
| 162,617 | 4/1875 | Brightman | 220/94 R |
| 163,359 | 5/1875 | Chambers Jr. et al. | 206/546 X |
| 679,588 | 7/1901 | Anderson et al. | 220/94 R |
| 1,202,148 | 10/1916 | Bartlett | 206/546 |
| 1,373,156 | 3/1921 | Tebbetts | 206/546 |
| 1,809,596 | 6/1931 | Nason | 206/546 |
| 2,501,572 | 3/1950 | Marquez | 220/94 R |
| 3,489,267 | 1/1970 | Carpenter | 206/499 X |
| 4,075,078 | 2/1978 | Nickell | 206/546 |

FOREIGN PATENT DOCUMENTS 1010253 2/1976 Canada ............... 99/339

Primary Examiner—Philiop R. Coe
Assistant Examiner—C. E. Cooley
Attorney, Agent, or Firm—Staas & Halsey

[57] ABSTRACT

A picnic cooking assembly includes a skillet, a cooking pan, and a kettle. The cooking pan nests within the skillet and the kettle nests within the skillet over the cooking pan. The cooking pan, inverted, fits over the skillet to form a food storage container. Moreover, the kettle is formed with a spout covered with a cap which is also securable to the kettle as a handle. Attached to the skillet is a handle which, when the cooking assembly is assembled, fits over and around the kettle, locking the cooking assembly together.

4 Claims, 4 Drawing Sheets

PICNIC COOKING ASSEMBLY

BACKGROUND OF THE INVENTION

This invention relates to a cooking assembly, and, more particularly, to a cooking assembly for use outdoors over an open fire.

A picnic cooking assembly should serve a variety of functions including that of a skillet, a cooking pan, a food storage container, and a kettle. When assembled for storage, the picnic cooking assembly should be compact and of handsome design.

SUMMARY OF THE INVENTION

Accordingly, a primary objective of the present invention is to provide a compact cooking assembly of handsome design suitable for use over an open fire.

A further objective of the present invention is to provide a cooking assembly which is able to function as a skillet.

A further objective of the present invention is to provide a cooking assembly which is able to function as a cooking pan.

A further objective of the present invention is to provide a cooking assembly which is able to function as a food storage container.

A further objective of the present invention is to provide a cooking assembly which includes a kettle.

A further objective of the present invention is to provide a cap for the spout of the kettle configuration which also attaches to the kettle to act as a handle for the kettle.

The picnic cooking assembly of the present invention includes a skillet, a cooking pan, and a kettle formed with a spout. The inverted cooking pan covers the skillet to form a food storage container. A cap which covers the spout of the kettle also attaches to the upper surface of the kettle to act as a handle. The cooking pan fits within the skillet and the kettle locks onto the skillet by means of the dual-acting skillet handle forming a handsome and compact picnic cooking assembly.

Further objectives and advantages of the present invention will become apparent as the following description proceeds, and the features of novelty which characterize the invention are pointed out with particularity in the claims annexed to and forming a part of this invention.

DETAILED DESCRIPTION OF THE PREFERRED EMBODIMENT

Figure 1:
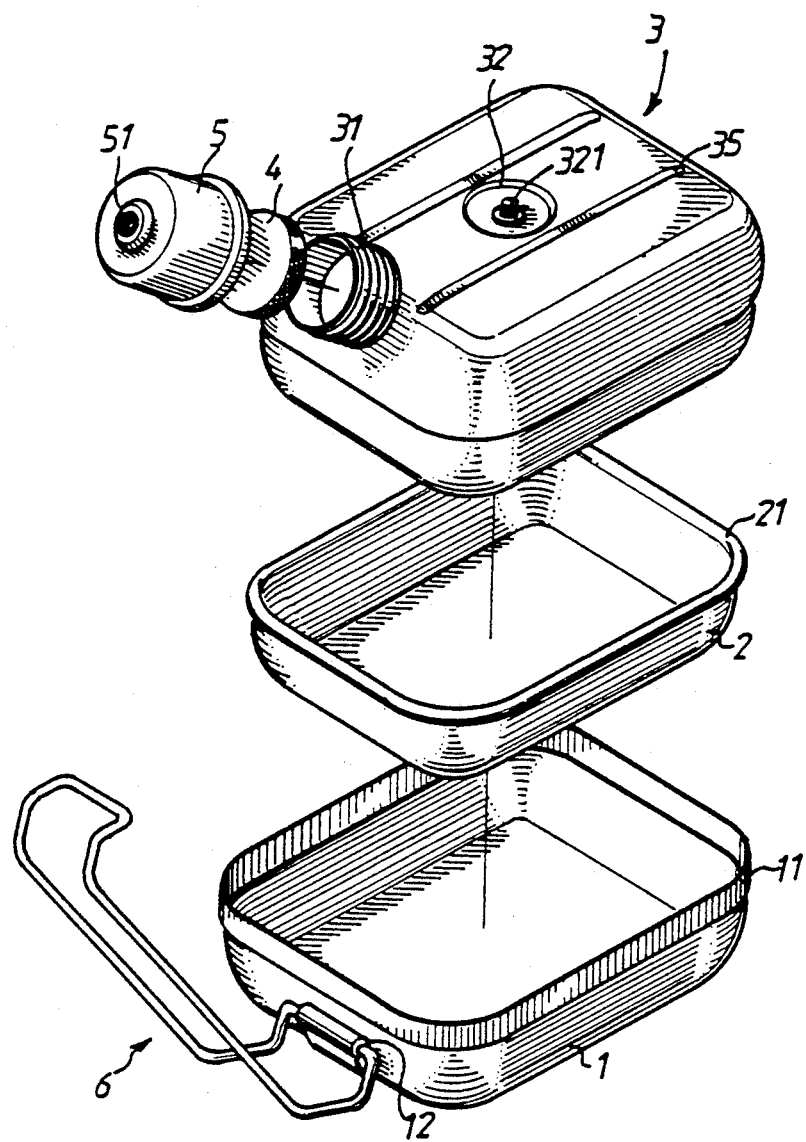
FIG. 1 is an exploded perspective view of a picnic cooking assembly in accordance with the present invention.

With reference to the drawings and initially to FIG. 1, it can be seen that a picnic cooking assembly includes a skillet 1, a cooking pan 2, and a kettle 3 which all nest together to form a compact cooking assembly of handsome design particularly adapted for use outdoors over an open fire.

Figure 2:
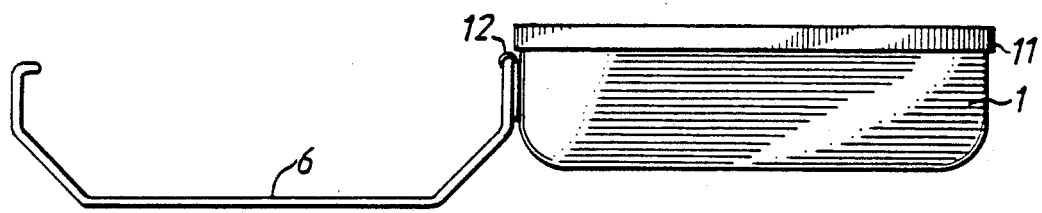
FIG. 2 is a side plane view of a skillet of FIG. 1.

The skillet 1, as shown in FIG. 2, is essentially rectangular in form. A lip 11 is formed around the upper rim of the skillet 1. To one side of the skillet 1 is attached a connecting means 12 through which a handle 6 is passable. The handle 6 is specifically designed to act, in the working position, as a handle for the skillet, and in the storage position, to lock the kettle 3 to the skillet 1, or, alternatively, the cooking pan 2 to the skillet 1. The end segment of the handle 6 which attaches to the connecting means 12 is therefore straight and uncurved in order to hold securely against the side of the skillet 1 when gripped by a user to hold the skillet 1. The other end segment of the handle is also straight and uncurved to lock tightly to the other side of the skillet 1.

Figure 3:
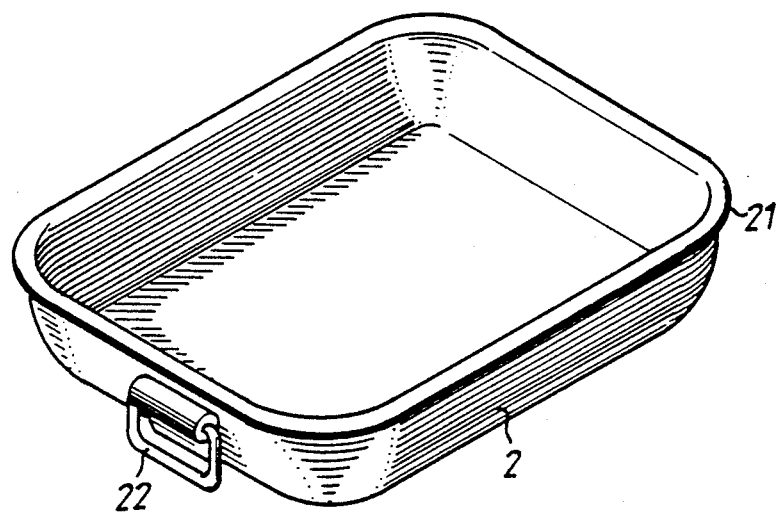
FIG. 3 is a perspective view of the cooking pan of FIG. 1.

The cooking pan 2 is a shallow pan formed with a lip 21 which nests within the skillet 1, the cooking pan lip 21 fitting to the inner ledge of the lip 11 of the skillet 1. FIG. 3 shows that the cooking pan 2 is further formed with a collapsible handle 22 which does not detract from the snug fit between the cooking pan 2 and the skillet 1.

Figure 4:
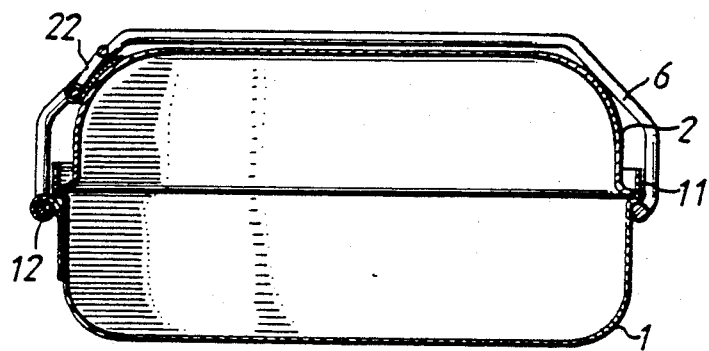
FIG. 4 is a plane view of the cooking pan inverted to cover the skillet in accordance with the present invention.

The cooking pan 2, inverted, fits to cover the skillet 1, as shown in FIG. 4. The inverted cooking pan 2 and skillet 1 act in conjunction as a food storage container. Moreover, the handle 6 of the skillet 1 fits over and around the cooking pan, locking the cooking pan 2 tight to the skillet 1.

With reference again to FIG. 1, it can be seen that the kettle 3 is shaped to nest within the skillet 1 providing maximum cooking flexibility.

Figure 5:
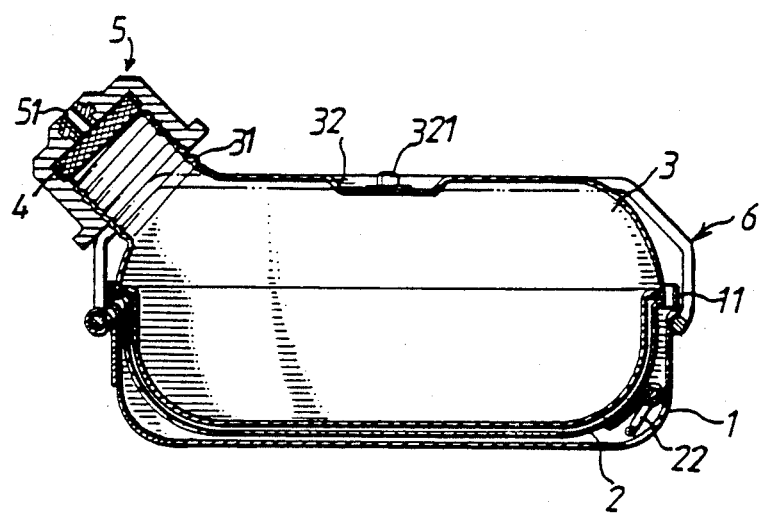
FIG. 5 is a cross-sectional side view of FIG. 1 in the storage position.

As shown in FIG. 5, a cork plug 4 is provided to fit within the spout 31, and a cap 5 twistably secures over the spout 31, to keep water from leaking out of the kettle.

Figure 6:
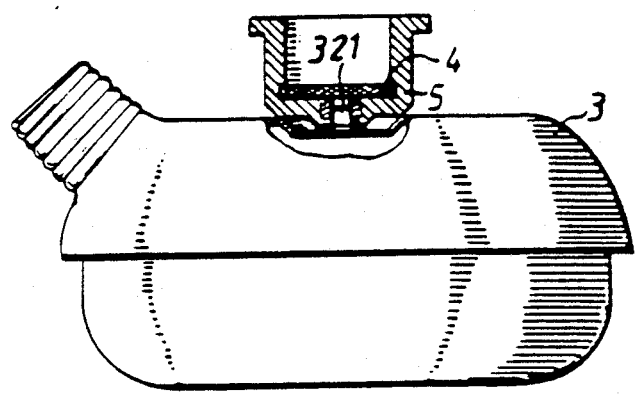
FIG. 6 is a cross-sectional side view of the cap, inverted, and mounted on top of the kettle; and, FIG. 7 is another preferred embodiment of a cap in accordance with the present invention.

The cap 5 is formed with a threaded hole 51 on a top portion thereof. Alternatively, as shown in FIGS. 5 and 6, the inverted cap 5 fits into a well 32 formed on a top portion of the kettle 3. Within the well 32 is a protruding threaded mounting bolt or screw 321 to which the cap 5 twistably secures by means of the threaded hole 51. The inverted cap 5, when screwed as such to the kettle 3, acts as a handle for lifting the kettle 3 when hot.

Figure 7:
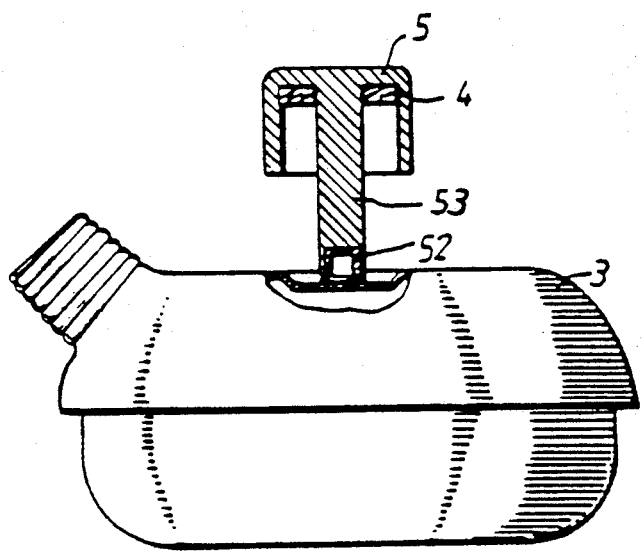

In another preferred embodiment of the cap 5, as shown in FIG. 7, the cork plug 4 is fitted within the cap 5, and an underside of the cap 5 is formed with a rod-shaped protrusion 53, an end of which is formed with the threaded screw hole 52. The cap 5 therefore need not be inverted for twistably securing to the kettle 3.

Therefore, the cooking pan 2 fits within the skillet 1, and the kettle 3 nests within the skillet 1 over the pan 2. The handle 6, moreover, is shaped to fit around and lock over the the kettle 3, as shown in FIG. 5 which is formed with grooves 35 for accepting the handle 6, making for a handsome and practical cooking assembly.

As various possible embodiments might be made of the above invention without departing from the scope of the invention, it is to be understood that all matter herein described or shown in the accompanying drawing is to be interpreted as illustrative and not in a limiting sense. Thus it will be apprecitated that the drawings are exemplary of a preferred embodiment of the invention.

I claim:

1. A picnic cooking assembly comprising:
   a skillet having a rim formed with a lip;
   a first handle attached to the skillet;
   a cooking pan which in a first uninverted position fits inside said skillet and in a second, inverted position fits on an inner ledge of said lip of said skillet to form a food storage container, a second handle being attached to said cooking pan and being collapsible to facilitate the fit of said cooking pan within said skillet when the cooking pan is in the second position;
   a kettle having a spout, said kettle being shaped to nest within said cooking pan when said cooking pan is in said first position said kettle having a threaded mounting bolt in a top portion of the kettle;
   a cap having a threaded hole in a central portion thereof and being fitted with a cork plug, said cap having a first position covering said spout wherein said cap seals said spout; and said cap having a second position threadedly engaging the mounting bolt of the kettle so that said cap provides a handle for holding the kettle.

2. A picnic cooking assembly according to claim 1, wherein said cap is of T-shaped cross-section, said cap further having a top with an inner portion having a center from which downwardly projects a shaft, and end of said shaft being formed with said threaded hole to threadably engage said mounting bolt of said kettle, such that said cap, uninverted, is twistably attachable to said kettle to act as said handle for holding said kettle.

3. A picnic cooking assembly according to claim 1, wherein said first handle has a first end being pivotally connected to said skillet through connecting means, a second end capable of snapping under said lip of said skillet at a point diametrically opposite the connecting means, and a straight middle segment for providing rigid support for said skillet when being held by a user by means of said first handle and for locking said kettle to said skillet when said second end snaps under said lip.

4. A pinic cooking assembly according to claim 1, wherein the mounting bolt of the kettle is located within a well of the top portion of the kettle, said well having a shape corresponding to a shape of the cap.

* * * * *